United States Patent [19]
Nakamura et al.
[11] 3,735,365
[45] May 22, 1973

[54] DATA EXCHANGE SYSTEM

[75] Inventors: Hideo Nakamura, Hachioji; Kazuo Takasugi, Higashiyamato; Minoru Hiroshima; Fumiyuki Inose, both of Kokubunji, all of Japan

[73] Assignee: Hitachi, Ltd., Tokyo, Japan

[22] Filed: Sept. 27, 1971

[21] Appl. No.: 183,807

[30] Foreign Application Priority Data

Sept. 25, 1970 Japan ....................45/83412

[52] U.S. Cl. ....................340/172.5
[51] Int. Cl. ....................G06f 15/16
[58] Field of Search ....................340/172.5

[56] References Cited

UNITED STATES PATENTS 3,480,914 11/1969 Schlaeppi ....................340/172.5
3,566,363 2/1971 Driscoll, Jr. ....................340/172.5
3,659,271 4/1972 Collins et al ....................340/172.5

*Primary Examiner*—Raulfe B. Zache
*Attorney*—Craig, Antonelli & Hill

[57] ABSTRACT

A system for data exchange among a plurality of electronic computers in which all the computers are connected to a bus, and a central control device, for assigning a bus available time to a computer making a request for data exchange communication with another computer, is connected to one end of the bus. A computer, when making such request, sends one bit of information to the control device. Upon receiving this information, the control device supplies the bus with a signal for checking which computer is making the communication request to which computer. When the pair of the computers to exchange data are determined, the addresses of these computers are registered, and the central control device supplies in sequence the registered pair of computers with a signal for permitting the computers to use the bus. Thus, on a time-sharing basis, a plurality of computers communicate with each other.

16 Claims, 16 Drawing Figures

DATA EXCHANGE SYSTEM

BACKGROUND OF THE INVENTION

1. Field of the Invention

The present invention relates to a control system using a plurality of electronic computers, and more particularly to a novel system for data exchange among computers.

This type of data exchange system is applicable to various control fields such as an automated system for a laboratory or hospital, for process control, a teaching machine and general numerical control.

2. Description of the Prior Art

A system using a data exchange control device for interlinking a plurality of computers for data exchange communications is known in the art. This system is characterized in that a control device having a buffer memory of one byte is disposed between two data processing units, which buffer memory is connected to the selector channel or multiplexer channel of the processing units, and said control device is given a data, byte-by-byte, from one of the processing units, which data is then supplied to the other processing unit.

This system, heretofore applied to duplex computer controls, was developed for the purpose of data exchange only between a pair of computers located adjacent to each other. Hence, when this system is applied to a large scale control arrangement, such as an automated system for a laboratory or hospital and an integrated process control, the following problems are inevitable:

1. In a control system associating large numbers of computers among which data is to be exchanged, a data exchange control device must be provided between every pair of computers. This results in a complex system organization and a costly control system.

2. This data exchange system is a system in which a certain definite quantity of data supplied to the data exchange control device is confirmed within a certain time interval, and then the subsequent data can be supplied to the control device. If the distance between the pair of computers is more than a certain limit, it is substantially impossible for these computers to exchange data. The limit of this distance is normally about 30 meters.

Another data exchange system proposed in the art is formed such that a plurality of computers are located at a substantial distance from each other, among which data is exchanged. This system comprises a communication control device connected to each of the computers, and the signal from a computer is converted into a signal suitable for data communication by said control device, thereby making the computers exchange data. In this system, the drawback as mentioned in paragraph 2 above is removed, and a pair of computers can exchange data over a long distance. However, the signaling speed in this system is as slow as 50 bauds to 2 kilobauds, and the problem as mentioned in paragraph 1 remains unsolved. Furthermore, for said signal conversion, costly communication control devices must be used.

SUMMARY OF THE INVENTION

In view of the foregoing, a general object of this invention is to provide a novel data exchange system.

More specifically, a principal object of this invention is to provide a data exchange system for enabling large numbers of data handling equipment to communicate with each other by a relatively simple arrangement, at a high signaling speed even over a long distance.

The other objects, features and advantages of the invention will be apparent from the following detailed description when read in conjunction with the accompanying drawings in which.

Figure 3:
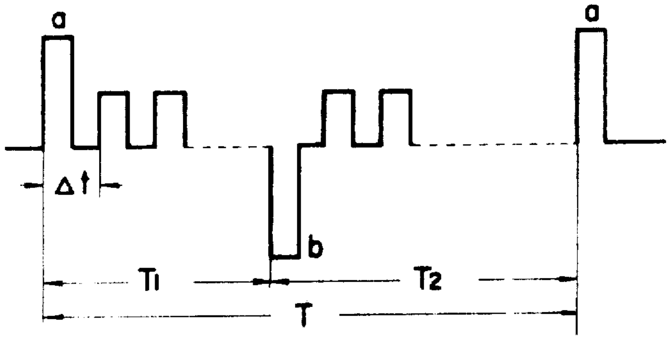
Figure 4:
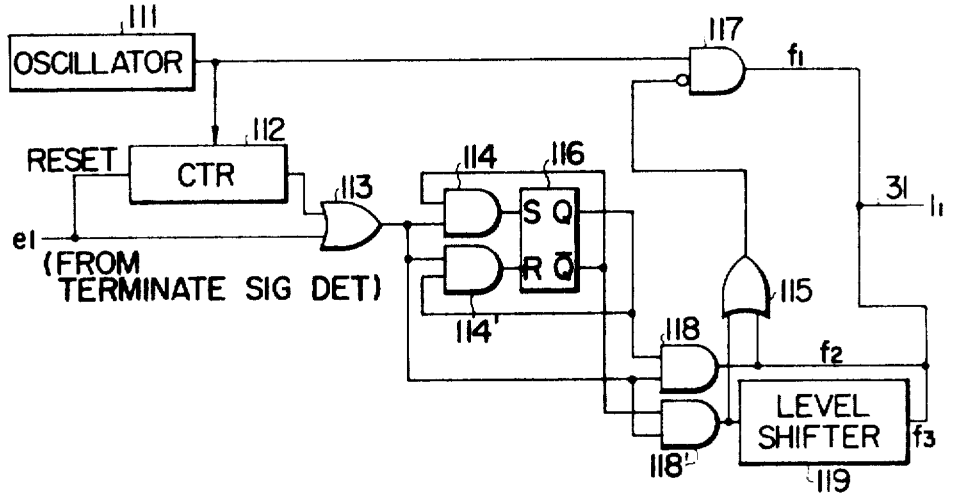
Figure 5:
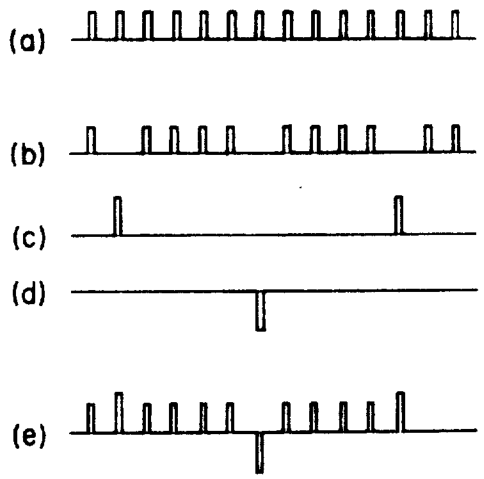
Figure 6:
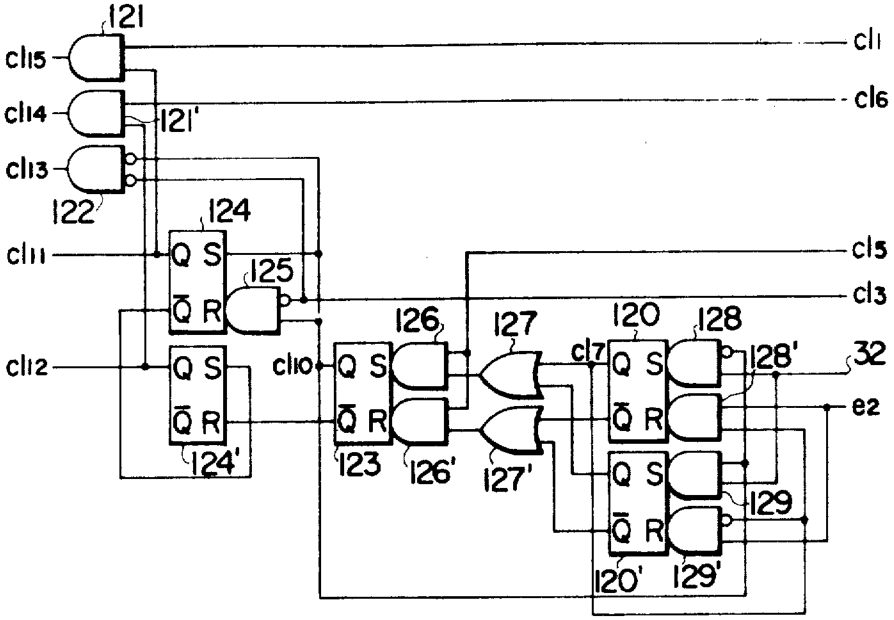
Figure 7:
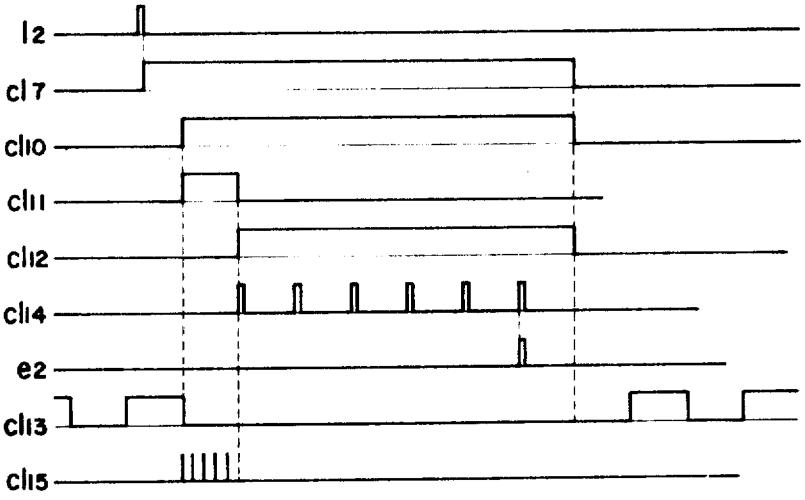
Figure 8:
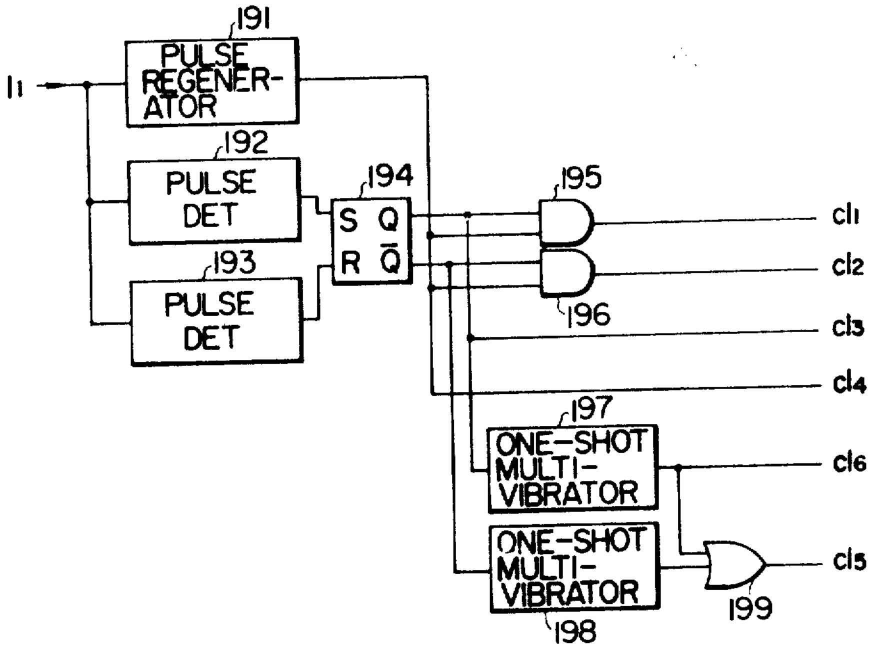
Figure 9:
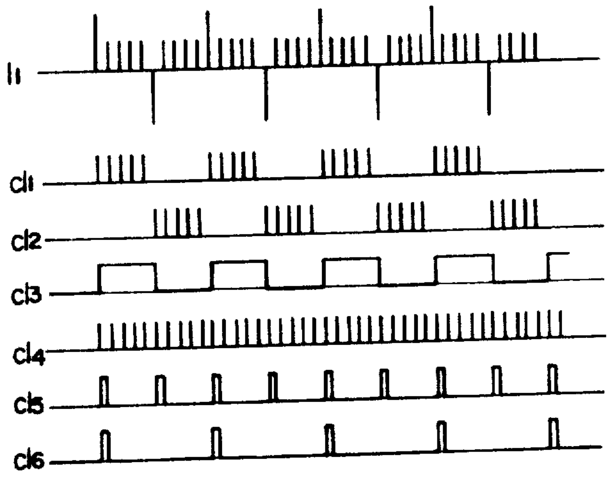
Figure 10:
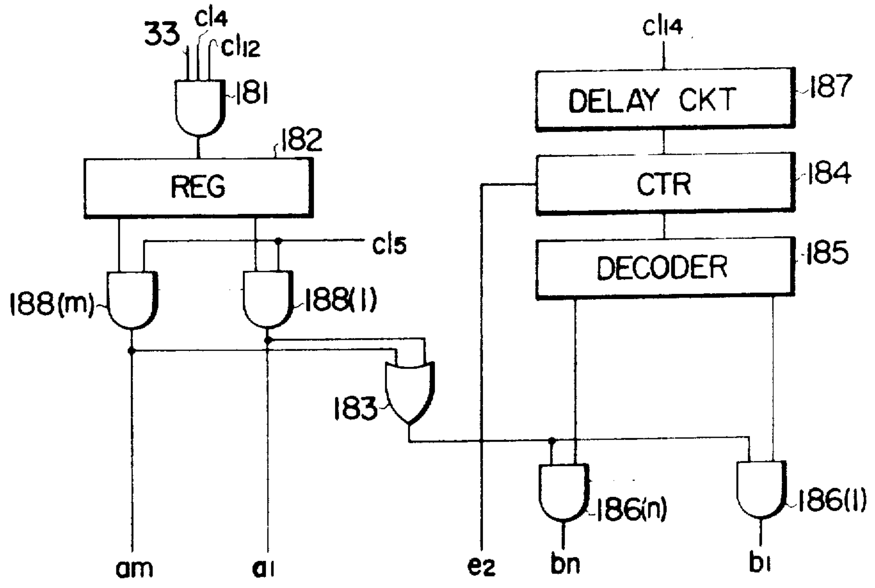
Figure 11:
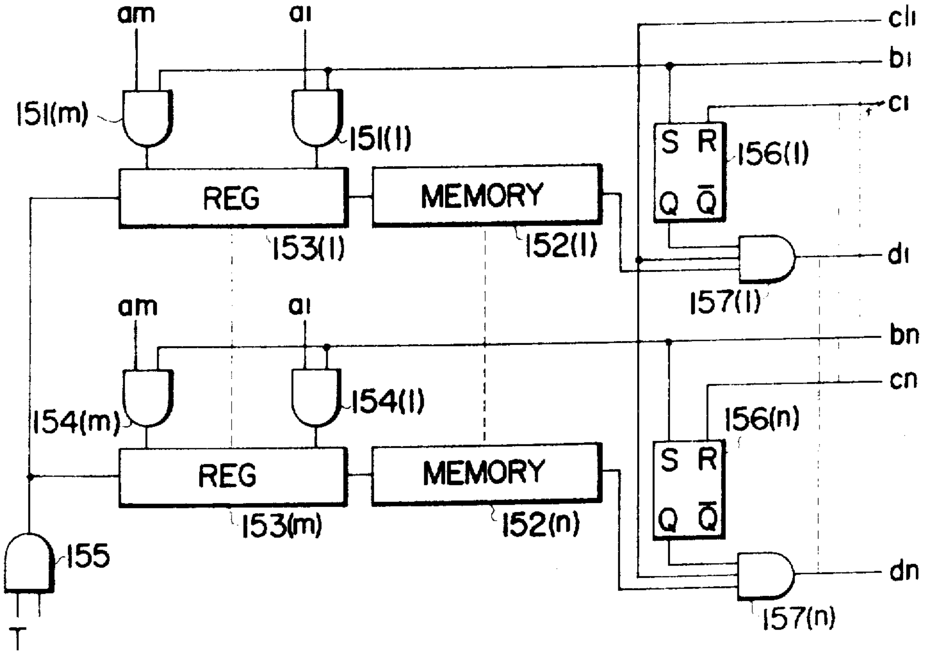
Figure 12:
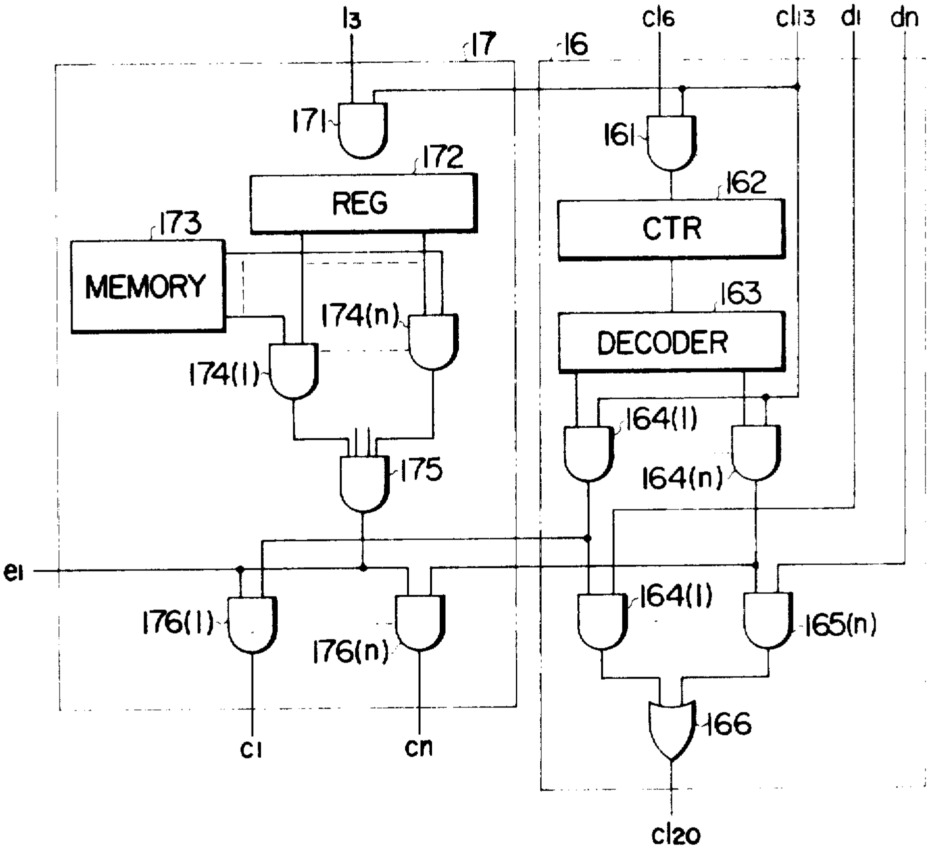
Figure 13:
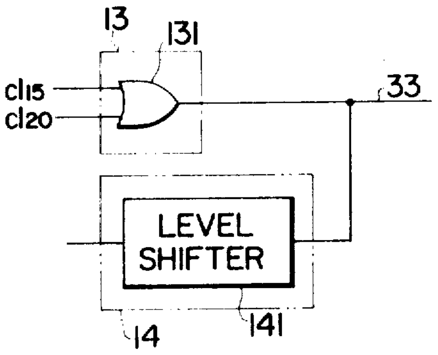
Figure 14:
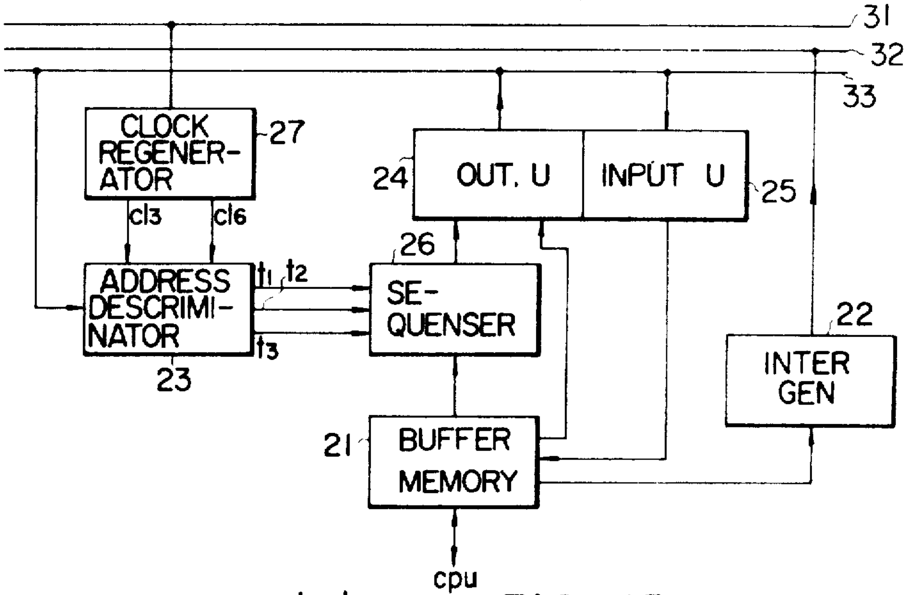
Figure 15:
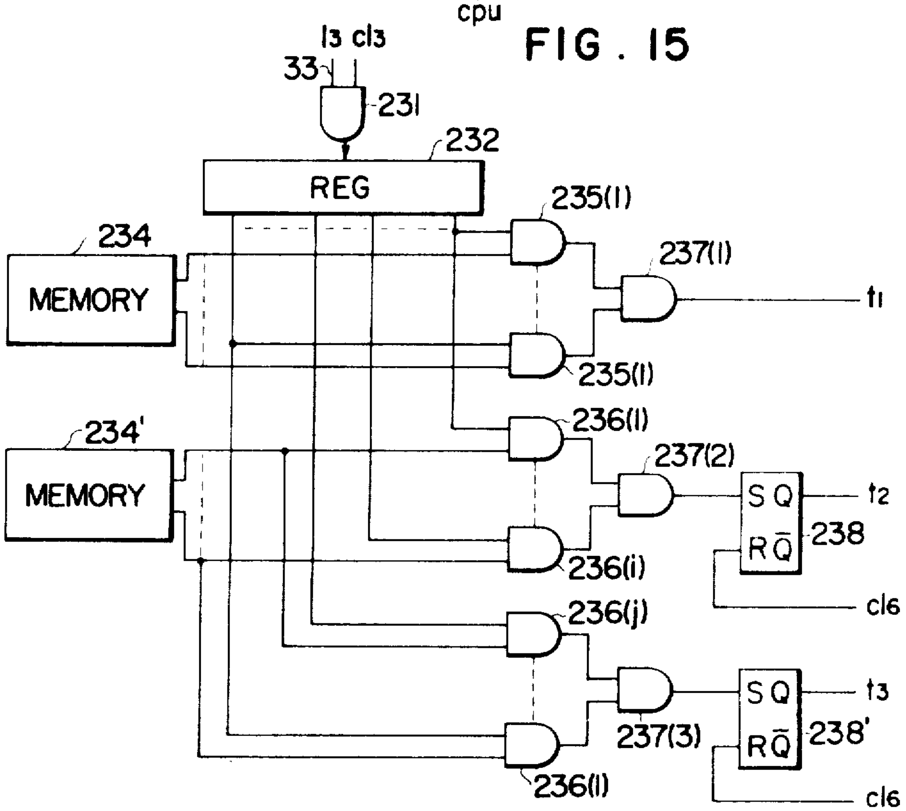
Figure 16:
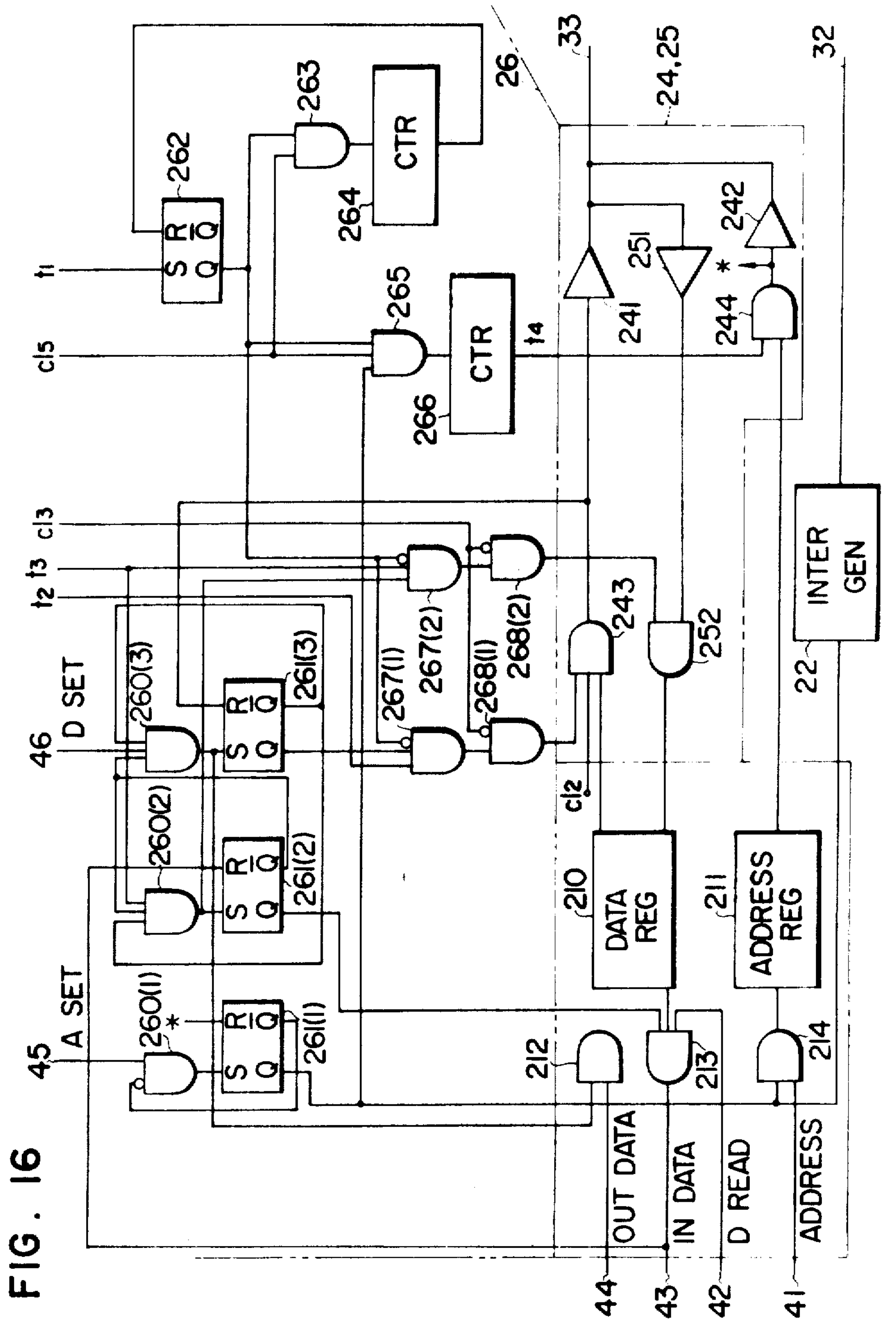

FIG. 3 schematically shows pulses used for the purpose of this invention;

FIG. 4 is a block diagram showing a clock pulse generator of this invention;

FIG. 5 is a time chart showing the operation of the clock pulse generator as in FIG. 4;

FIG. 6 is a block diagram showing an interrupt generator of this invention;

FIG. 7 is a time chart showing the operation of the interrupt generator of FIG. 6;

FIG. 8 is a block diagram showing a clock pulse regenerator of this invention;

FIG. 9 is a time chart showing the operation of the clock pulse regenerator of FIG. 8;

FIG. 10 is a block diagram showing an address recognizing unit of this invention;

FIG. 11 is a block diagram showing an address memory of this invention;

FIG. 12 is a block diagram showing a terminate signal detector and an address signal transmitter of this invention;

FIG. 13 is a schematic block diagram showing input and output units of this invention;

FIG. 14 is a schematic block diagram showing the arrangement of devices connected to the bus;

FIG. 15 is a block diagram showing an address discriminator device of this invention; and FIG. 16 is a block diagram showing a transmission sequence device and input and output units of this invention.

DESCRIPTION OF THE PREFERRED EMBODIMENTS

Figure 1:
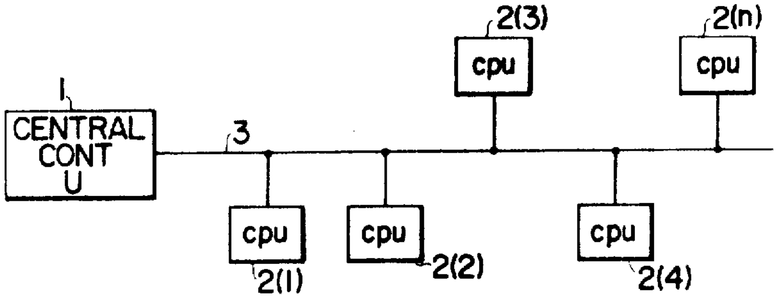
FIG. 1 is a schematic diagram showing a system of this invention.

Referring to FIG. 1, there is shown one basic arrangement of a system of this invention wherein a plurality of computers 2(1) through 2(*n*) among which data is exchanged, are connected in common to a bus 3, and a central control unit 1 is connected to one end of the bus 3.

The bus 3 comprises an interrupt line through which a computer sends a communication requesting signal of one bit to the central control unit 1, a synchronous pulse line through which the central control unit 1 sends a synchronous pulse, and a data line for data signal transmission.

In this system, data is transferred from CPU 2(1) to CPU 2(2) in the following manner.

The device CPU 2(1) sends a communication request signal of one bit to the central control unit 1 through the interrupt line. Upon receiving this signal, the control device 1 sends out a specific address pattern for checking which device is making a data exchange request to which device. The device 2(1), when receiving this pattern, sends out the address of the desired device 2(2) at a timing corresponding to the device 2(1). The control device 1 discriminates the address of the device 2(1) according to the timing at which the address of 2(2) is transmitted. The content of this transmitted address determines for the control device the address of 2(2). The control device 1 then stores the two addresses in a pair of storage locations. The control device sends said pair of addresses to the bus in the interval $T_1$ between pulses *a* and *b*, as seen in FIG. 3. The device 2(1) discriminates the given addresses, and sends data during the time $T_2$. The device 2(2) discriminates the address in the interval $T_1$, and reads the data supplied during the time $T_2$.

Figure 2:
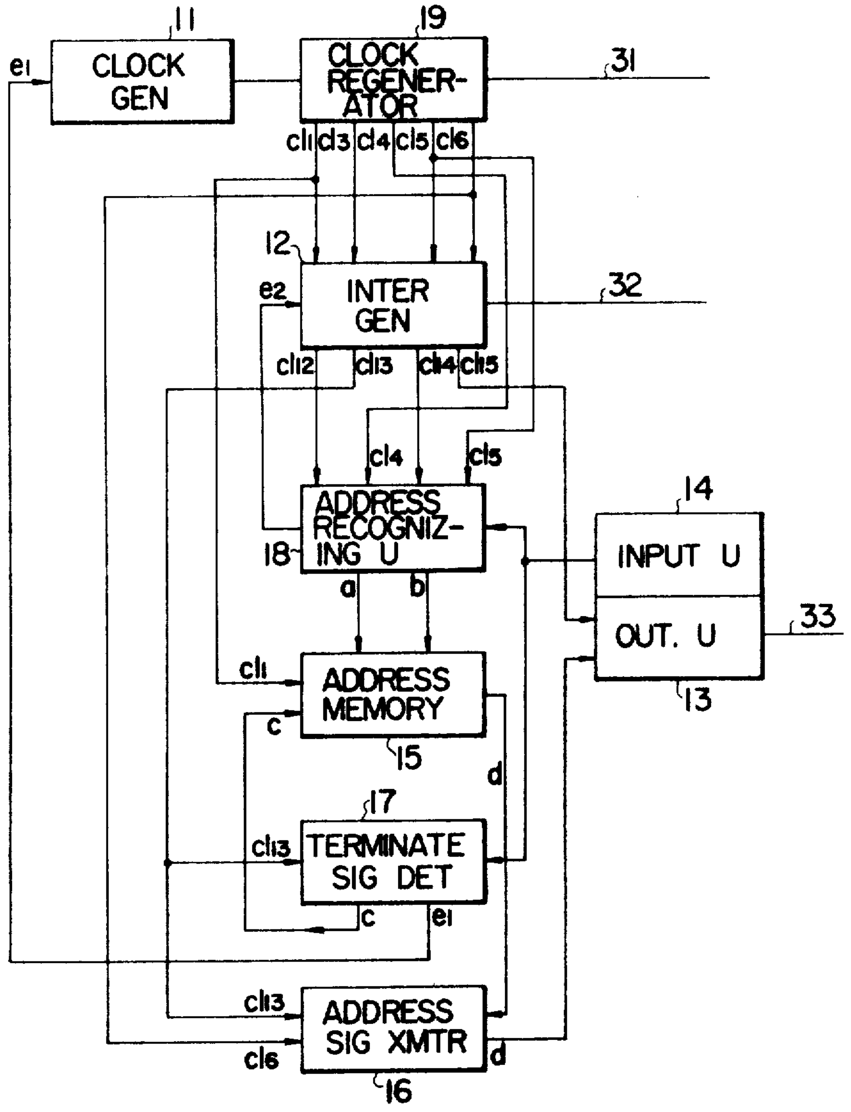
FIG. 2 is a block diagram showing a central control device of this invention.

The central control device 1, as shown in FIG. 2, comprises a clock pulse generator 11, an interrupt generator 12, an output unit 13, an input unit 14, an address memory 15, an address signal transmitter 16, a terminate signal detector 17, an address recognizing unit 18, and a clock regenerator 19. These individual devices will be specifically described below.

CLOCK PULSE GENERATOR 11

The purpose of this device is to supply a synchronous pulse, as shown in FIG. 3, to the computers connected to the bus 3. In FIG. 3, the references a and b denote pulses used for discrimination. Synchronizing with the synchronous pulse, the address signal is transmitted in the interval $T_1$, and the data signal is transmitted in the interval $T_2$.

Referring to FIG. 4, there is illustrated the details of the clock pulse generator 11 wherein the reference 111 indicates an oscillator for producing a clock pulse at specific intervals. The output of this oscillator is applied to a clock counter 112. This counter starts counting from all "0," and delivers a one bit signal when the count reaches a certain definite number. At this moment, the counter resets its contents to all "0," and then repeats the same operation. The reference $e_1$ denotes the output of the terminate signal detector 17. The counter 112 is reset also to all "0" by the output of the terminate signal detector 17.

The output pulse of counter 112 is applied to AND gates 114 and 114' and to AND gates 118 and 118' by way of OR gate 113. The numeral 116 denotes a flip-flop, to the set terminal S of which the output of AND gate 114 is applied, and to the reset terminal R of which the output of AND gate 114' is applied. One of the outputs of flip-flop 116 is applied to the AND GATES 118 and 114', and the other output is applied to AND gates 118' and 114. The outputs of AND gates 118 and 118', after being inverted by OR gate 115, are applied to the AND gate 117. The numeral 119 indicates a level shifter, which delivers a "0" output when the output of AND gate 118' is "0," or delivers "−1" when the output of AND gate 118' is "1." The composite signal of the outputs of AND gates 117, 118 and level converter 119 is applied to the clock pulse line 32.

This clock pulse generator is operated in the following manner. The clock pulse oscillator 111 generates a pulse as shown in FIG. 5(*a*). This pulse is sampled at certain specific intervals by the register 112. The sampled pulses are alternated by the flip-flop 116 and delivered alternately from the AND gates 118 and 118', though the polarity of the output pulse of gate 118' has been inverted by the level shifter 119. FIG. 5(*c*) and (*d*) show the outputs of gate 118 and level shifter 119, respectively.

A pulse train as shown in FIG. 5(*a*) is applied to the AND gate 117. The output pulse train from the AND gate 117 takes the form as indicated at (*b*) in FIG. 5 since the pulses as seen in FIG. 5(*c*) and (*d*) are prevented from passing through the AND gate 117 at a certain timing.

Thus, the pulses (*b*), (*c*) and (*d*) in FIG. 5 are combined to form a composite output, as shown in FIG. 5(*e*).

CLOCK REGENERATOR 19

This device receives the signal from the foregoing clock pulse generator 11, and generates a synchronous clock or timing pulse necessary for address transfer, data transfer or interrupt processing.

FIG. 8 shows a clock regenerator 19 wherein a pulse train, as indicated by line *l* 1 in FIG. 9, supplied from the clock pulse generator 11 is applied to a pulse regenerator 191, to a pulse detector 192 having a threshold which can detect only high level pulses, and also to a pulse detector 193 having a threshold against negative pulses. The signal supplied to the pulse regenerator 191 is converted into a pulse train as indicated by line $cl_4$ in FIG. 9. The outputs of pulse detectors 192 and 193 are applied to the set terminal S and reset terminal R of flip-flop 194, respectively. The output Q of this flip-flop and the output of pulse regenerator 191 are applied to the AND gate 195, which then delivers an output as indicated by line $cl_1$. In other words, line $cl_1$ is an AND logic output as shown in FIG. 9. On the other hand, the output $\overline{Q}$ of flip-flop 194 and the output of pulse regenerator 191 are applied to the AND gate 196. The resultant output is a pulse train as indicated by line $cl_2$ in FIG. 9. The references 197 and 198 denote one shot multivibrators, which generate pulses at the timing where the outputs Q and $\overline{Q}$ of flip-flop 194 are switched to "1" from "0." The output of multivibrator 197 is as indicated by line $cl_6$, and the outputs of multivibrators 197 and 198 are $cl_5$ after OR logic by OR gate 199.

The output $cl_1$ is used as the synchronous clock for address transmission; $cl_2$ is used as the synchronous clock for data transmission; and $cl_3$ through $cl_6$ are used as the timing pulse for the interrupt detector 12 and other devices.

INTERRUPT GENERATOR 12

Any computer connected to the bus is supposed to send a one bit interrupt signal to the bus control device when use of the bus is desired for data exchange with another computer. The interrupt generator 12 receives this interrupt signal via the interrupt line 32, and generates a timing necessary for the address recognizing unit 18 and address signal transmitter 16, etc. in order to assign the bus to the communication requesting computer on a time sharing basis.

Referring to FIG. 6, there is shown an interrupt generator 12 wherein the interrupt signal supplied through the interrupt line 32 is applied to the AND gates 128 and 129. At this moment, when the output $cl_{10}$ of flip-flop 123 is "1," the interrupt signal passes through the gate 129 and sets the flip-flop 120'. While, when the output of flip-flop 123 is "0," the interrupt signal passes through the gate 128 and sets the flip-flop 120.

The interrupt processing signal $e_2$ and the output of flip-flop 120 are gated by the AND gates 128' and 129'. The signal $e_2$ is generated by the address recognizing unit 18 which will be described in the succeeding part of this specification. When the output of flip-flop 120 is "1," the flip-flop 120 is reset by the output of gate 128'. While, when it is "0," the flip-flop 120' is reset by the output of gate 129'.

The outputs Q of flip-flops 120 and 120' go to the OR gate 127. The resultant output of the gate 127 is applied to the AND gate 126. The outputs $\overline{Q}$ of flip-flops 120 and 120' go to the OR gate 127'. The resultant OR output of gate 127' is applied to the AND gate 126'. The gate 126 sets the flip-flop 123 by the AND output of synchronous pulse $cl_5$ and the output of gate 127. The gate 126' resets the flip-flop 123 by the AND output of synchronous pulse $cl_5$ and the output of gate 127'. The output Q of flip-flop 123 is applied to the set terminal S of flip-flop 124 and also to the AND gates 125 and 122. The output $\overline{Q}$ of flip-flop 124 is applied to the reset terminal of flip-flop 124'. The flip-flop 124 is reset by the output of gate 125, and the flip-flop 124' is set by the output $\overline{Q}$ of flip-flop 124. The AND gate 121 delivers an AND output $cl_{15}$ from the synchronous pulse $cl_4$ and the output Q of flip-flop 124. The AND gate 121' delivers an AND output $cl_{14}$ from the synchronous pulse $cl_6$ and the output Q of flip-flop 124'. The gate 122 delivers an AND logic output $cl_{13}$ from the negation of synchronous pulse $cl_3$ and the negation of output Q of flip-flop 123. Also, the gate 122 turns the outputs Q of flip-flops 124 and 124' into pulses $cl_{11}$ and $cl_{12}$, respectively.

The operation of the interrupt generator 12 will be described below with reference to the time chart in FIG. 7.

When a one bit interrupt signal as indicated by $l_2$ in FIG. 7 is sent in through an interrupt line 32, one of the flip-flops 120 and 120' is set according to the state of flip-flop 123. The Q output $cl_{10}$ of the flip-flop 123 is "1" during the interrupt processing. Therefore, when an interrupt request comes in during the communication mode, the flip-flop 120 is set. While, when an interrupt request comes in during the interrupt processing mode, the flip-flop 120' is set. The outputs Q of the two flip-flops 120 and 120' are OR-gated by the gate 127. The resultant OR output sets the flip-flop 123, synchronizing with the synchronous signal $cl_5$. The flip-flop 123 indicates by its state whether an interrupt is being processed or not.

The flip-flop 124 is set by the Q output $cl_{10}$ and then is reset at the time when the synchronous signal $\overline{cl_3}$ becomes "1." Therefore $cl_{11}$ is "1" only for the beginning period where $cl_3$ is "1" at the time when $cl_{10}$ becomes "1." This signal $cl_{11}$ serves as the timing used when a specific address pattern is supplied to the computers from the interrupt generator through the bus. When this specific pattern is all "1" bit pulses, the AND output $cl_{15}$ derived from $cl_{11}$ and $cl_1$ is used. When the flip-flop 124 switches its state from "1" to "0," the flip-flop 124' is set to make $cl_{12}$ a "1." The signal $cl_{12}$ serves as the timing at which the address signal supplied from the computer according to the specific pattern sent from the interrupt generator is received by the address recognizing unit 18.

ADDRESS RECOGNIZING UNIT

This device registers the received data during occurrence of an interrupt request, and judges the address of the computer which is making request for communication and the address of the requested computer. The address recognizing unit causes the address memory 15 store the judged result.

FIG. 10 shows an arrangement of the device 18, which is operated in the following manner. The signal $l_3$ from the data line 33 through the input unit 14, and the foregoing timing pulses $cl_5$ and $cl_{12}$, are supplied to the AND gate 181. The resultant AND logic output is set into the register 182. In other words, the signal $l_3$ coming in at the timing $cl_5$ for the period that $cl_{12}$ is "1" is stored in the register 182. The individual bit outputs of the register 182 are given as $a_1$ through $a_m$.

The counter 184 counts the pulse signal $cl_{14}$ applied from the interrupt processing device. When its count overflows, the counter 184 delivers an output $e_2$. At the same time, the counter is reset to the initial state. The content of the counter is decoded by the decoder 185. The decoded output signal is applied to one of the address gates 186(1) through 186($n$) according to the content of counter 184. The outputs of register 182 are applied to the OR gate 183, and the resultant OR logic output is applied to the gates 186(1) through 186($n$).

When any computer connected to the bus desires to make a communication request, this computer is caused to send out the address of the partner computer at the timing assigned to the communication requesting computer for the period the signal $cl_{12}$ is "1." Namely, the signal entering this address decision device has the address of the initial requesting computer and the address of the partner computer. This operation can be performed in such manner that the former address is discriminated by the timing at which the latter address is generated.

More specifically, a system comprising $n$-number of computers connected to the bus is considered. In this system, one cycle of the signal sent from $l_3$ is divided into n-number of time widths, and it is so arranged that the computers correspond to these time widths in a one-to-one relationship. The initial requesting computer, when supplied with a specific address pattern, is caused to code the address of the partner computer and send out the coded address during its own time width. The address recognizing unit 18 detects the kind of address signal and its time width position counter from the start pulse in one cycle, thereby recognizing both the address of the initial requesting computer and that of its partner computer.

Even if a plurality of initial request signals are concurrently presented, the address signals can be discriminated. Without making an interrupt request, a computer delivers no output to the data line 33 at the timing assigned to this computer and, therefore, the signal on this data line is all "0."

Synchronizing with the clock $cl_5$, the address recognizing unit 18 sets into the register 182 in sequence the address signal transmitted at the timing where $cl_{12}$ is "1," and provides its bit outputs in the form of signals $a_1$ through $a_n$. All the bit outputs of register 182 are OR-gated by the gate 183. The OR gate 183 delivers a "1" output at the timing at which the address is sent, or a "0" output at the timing at which the address is not sent. The timing pulse $cl_{14}$ is synchronous with $cl_3$ for the period the pulse $cl_{12}$ is "1," thereby providing an output. The counter 184 increases its content by "1" each time the pulse $cl_{14}$ becomes a "1." The resultant output of the counter 184 is decoded by the decoder 185, thereby making one of the gates 186(1) through 186($n$ ) deliver an output. While, the communication requesting computer sends out the address signal of the partner computer at the timing $cl_{14}$ assigned to the communication requesting computer. In this state, the signals $a_1$ through $a_n$ indicate the address of the computer with which data is exchanged, and "$i$" of the signal $bi$ which is a "1" output from one of the gates 186(1) through 186($n$) indicates the address (i.e., initial address) of the computer making a request for data exchange.

ADDRESS MEMORY 15

This device stores the initial address and the partner's address in a pair, which are supplied from the address recognizing unit 18.

FIG. 11 shows an example of this address memory 15. Referring to FIG. 11, the signals $a_1$ through $a_m$ indicating the partner's address, and the signals $b_1$ through $b_n$ indicating the initial address, which are sent from the address recognizing unit 18, go to the AND gates 151(1) through 151($m$) and 154(1) through 154($m$). The outputs of AND gates (1) through ($m$) are applied to the registers 153(1) through 153($n$).

When one of the signals $b_1$ through $b_n$ such as for example $b_1$, is "1," the content of $a_1$ through $a_n$ which indicates the partner's address is set into the register 153($i$), which is one of the registers 153(1) through 153($n$). The signals $b_1$ through $b_n$ are applied also to the set terminals 156(1) through 156($n$), respectively. As a result, the flip-flop 156($i$), which corresponds to $b_i$, is set to "1." These flip-flops 156(1) through 156($n$) are reset by the outputs $c_1$ through $c_n$ of the terminate signal detector, which will be described later. The address patterns corresponding to $b_1$ through $b_n$ are stored beforehand in the memories 152(1) through 152($n$). Then, the initial addresses are stored in the flip-flops 156(1) through 156($n$), and the individual partners' addresses are stored in the registers 153(1) through 153($n$).

The address pattern of the computer making an initial request and the address pattern of the partner computer are derived from the address memory 15 in the following manner. A shift pulse is applied to the gate 155 and a timing pulse $cl_1$ is applied to the gates 157(1) through 157($n$). By this operation, the contents of the memory 152 and register 153 are shifted by one bit, and the resultant output is obtained from the AND gate 157 synchronously with $cl_1$. For example, when $b_i$ is a "1," the gate 157($i$) is opened, and the initial address pattern of 152($i$) and the partner's address pattern of 153($i$) are sequentially obtained as an output $d_i$.

TERMINATE SIGNAL DETECTOR 17 AND ADDRESS SIGNAL TRANSMITTER 16

The terminate signal detector 17 discriminates whether or not the data signal supplied through the data line 33 is a signal indicating the end of data transfer. When the signal does not signify the end of data transfer, the device is not operated. When it is the end signal, the device 17 immediately sends a signal to the address memory 15 to stop supplying the initial address and its partner's address.

The address signal transmitter 16 controls a plurality of computers which are making an initial request so that their address patterns are sent to the bus periodically on a time sharing basis.

FIG. 12 shows an example of the terminate signal detector 17 and address signal transmitter 16. The terminate signal detector 17 is operated in the following manner.

The data signal coming in through the data line 33 is applied to the AND gate 171. This data is then set to the register 172 at the time at which the timing pulse $cl_{13}$ is a "1." The content of this register and the content stored in the memory 173 are compared, bit by bit, by the AND gates 174(1) through 174($n$). The gate 175 delivers an output "1" only when all contents are coincident. The timing pulse $cl_{13}$ serves as a timing at which data is supplied to the data line 33.

When a specific address pattern indicating the end of communication is set in the memory 173, the output of gate 175 becomes "1" at the time at which the communication end pattern is transmitted through the data line. This output "1" goes to the AND gates 176(1) through 176($n$).

While, the timing signals $cl_{13}$ and $cl_6$ are compared with each other by the AND gate 161 of the address control device 16, and the resultant output is applied to the counter 162. In the normal communication mode, the counter 162 counts the number of pulses $cl_6$. When the count overflows (i.e., the count reaches $n$), the counter is reset and starts counting $cl_6$ from the beginning. The decoder 163 decodes the output of the counter 162 and delivers a gate signal to one of the gates 164(1) through 164($n$) according to the content of the counter 162. The gate 164 releases the output of decoder 163 at the timing of $cl_{13}$. This output goes to the gates 176(1) through 176($n$) and 165(1) through 165($n$). The outputs $d_1$ through $d_n$ of address memory 15 are applied also to the gates 165(1) through 165($n$). As a result, the gate 165($i$) designated by the output of decoder 163 is opened, and the output $d_i$ of address memory 15 is generated. The outputs of gates 164(1) through 164($n$) are applied to the gates 176(1) through 176($n$) whereby AND logic is applied to these outputs against the output $e_1$ of gate 175. The resultant AND outputs $c_1$ through $c_n$ serves as signals to reset the flip-flops 156(1) through 156($n$) of address memory 15.

In the above manner, the terminate signal detector 17 discriminates the data exchange terminate signal and stops the address pattern supply.

The address signal transmitter 16 sends out the signals $d_1$ through $d_n$, which indicate the address pattern of the initial requesting computer and the address pattern of the partner computer, from the OR gate 166 periodically on a time sharing basis.

OUTPUT UNIT 13 AND INPUT UNIT 14

FIG. 13 shows an example of these input and output units. For a system where a binary signal is supplied directly to the bus 33, the output unit 13 may be organized only of OR gates for $cl_{15}$ and $cl_{20}$ and no special device is needed for the receiver 14. When a level difference is present between the signal on the bus and the signal within the device, the use of a level shifter 141 is required.

The devices connected to the bus will now be described. These devices are, as shown in FIG. 14, computers among which data is exchanged, a buffer memory 21, an interrupt generator 22 for generating an interrupt signal to be transmitted to the bus control device, an address discriminator 23, an output unit 24, an input unit 25, and a transmission sequencer 26.

The address discriminator 23 receives the signal on the data line 33, extracts the address signal therefrom, and discriminates whether this signal represents its own address or not. When it represents its own address, the address discriminator 23 supplies a set signal to the output unit 24 and input unit 25. The transmission sequencer 26 sends a set signal to the input unit 25 in the transmission operation, or to the receiver 24 in the receiving operation. The data in the buffer memory 21 is sent to the data line 33, or the data from the data line 33 is accepted by the buffer memory 21 only when the set signal is supplied from both the address discriminator 23 and the transmission sequencer 26 to the output unit 24 and input unit 25.

ADDRESS DISCRIMINATOR 23

An example of the address discriminator is illustrated in FIG. 15 wherein the signal $l_3$ and the timing signal $cl_3$ from the bus 33 go to the AND gate 231. The signal $l_3$ coincident with the timing at which the signal $cl_3$ is "1" is stored in the register 232. The memory 234 stores a pattern, such as for example an all "1" pattern, which is the same as the specific pattern which is supplied from the bus control device 1 for the purpose of recognizing the address of the initial requesting computer. The address patterns corresponding to the individual computers are stored in the memory 234'. The contents of the memory 234 are compared with those of the register 232, bit by bit, by the AND gates 235(1) through **235(*l*). The signal $t_1$ being a "1" is made available from the gate 237(1)** only when all the contents are coincident as the result of the above comparison.

Also, the contents of the memory 234' and of the register 232 are compared with each other, bit by bit, by the AND gates 236(1) through **236(*l*). When the first half of the contents of the register are coincident with the memory contents, a signal is delivered from the gate 237(2) to set the flip-flop 238. While, when the latter half of the contents of register 232 are coincident with the memory contents, an output is delivered from the gate 237(3) to set the flip-flop 238'. The flip-flops 238 and 238'**, when set, deliver output signals $t_2$ and $t_3$, respectively. These flip-flops are reset by the timing signal $c_6$.

The outputs $t_1$, $t_2$ and $t_3$ obtained in the foregoing manner provide timings: $t_1$ for interrupt processing, $t_2$ for data transmission, and $t_3$ for data receiving.

TRANSMISSION SEQUENCER 26, OUTPUT UNIT 24, INPUT UNIT 25

FIG. 16 shows in detail the arrangement of transmission sequencer 26, output unit 24, input unit 25 and buffer memory 21. In FIG. 16, the reference 261 denotes flip-flops; 261(1) stores the data as to whether the partner's address is written from the computer into its connected device; 261(2) indicates by its state whether the data from the bus is readable by the computer; and 261(3) indicates by its state whether the data written out from the computer can be sent to the bus. The register 210 stores the data and register 211 stores the partner's address. The counter 266 determines the timing at which the partner's address is sent out in the interrupt initial operation. The counter 264 determines the timing at which the address transmission (for interrupt initial) from all the addresses is terminated. The counters 266 and 264, when the count is a predetermined value, deliver one bit outputs respectively, and return to the initial state. The flip-flop 262 is set by the signal $t_1$ which indicates the start of interrupt initial and is reset by the output of counter 264 which indicates the end of an interrupt initial.

In the transmitter/receiver 24 and 25, the references 241, 242 and 251 indicate buffer amplifiers. The reference 22 denotes a one shot multivibrator which generates a pulse with a certain definite width at the timing at which the flip-flop 261(1) is set. This pulse is applied to the bus 32.

The other elements of the system will be more apparent from the following description. It is assumed that a computer 2(1) is to exchange data with another computer **2(*i*). For this operation, the computer 2(1) delivers the address of the partner computer to the address line 41, and the data to the output data line 44. Synchronizing this data, an A set signal is applied to the gate 260(1) via the line 45 and a D set signal is applied to the gate 260(3) via the line 46. The A set signal sets the flip-flop 260(1) when the output of this flip-flop is "0." If the flip-flop 260(1) is already "1", this shows that the previously set interrupt has not been processed. When the flip-flop 261(1) is set, the AND gate 214 is opened by the output Q of the flip-flop 261(1), and the signal on the address line 41 is applied to the address register 211. In other words, the signal is set to the register 211 only in the state that the previous interrupt processing is over. At the time at which the flip-flop 261(1) is set, the one shot multivibrator 22 generates a pulse signal, which is then sent to the interrupt line 32. This pulse is applied to the foregoing interrupt processing device 12 of central control device 1. By this operation, the flip-flop 123 is set. The flip-flop 124 is set by the output signal $cl_{10}$ of flip-flop 123. This flip-flop 124 is reset when the signal $cl_3$ becomes a "1." Under this condition, a pattern corresponding to one cycle of $cl_1$, as shown in FIG. 10, is delivered from the AND gate 121. This pattern ($cl_{15}$) is applied to the data line 33 by way of the transmitter 13**. This signal has the specific pattern of all "1."

This specific pattern goes to the register 232 of address discriminator 23 through the line 33. The all "1" pattern is previously stored in the memory 234 of address discriminator 23. Therefore, when the specific pattern comes in, the outputs of gates 235(1) through **235(*l*) turn into all "1," and the signal $t_1$ being a "1" is delivered from the gate 237(1). When the signal $t_1$ becomes a "1," the flip-flop 262 of transmission sequencer 26 is set, and the interrupt processing mode is stored therein. The output Q of flip-flop 262 is applied to the gate 265. Besides this output Q, another output Q of flip-flop 261(1) and the timing signal $cl_5$ are applied to the gate 265. When both Q outputs become a "1," and $cl_5$ also turns into a "1," the timing signal $cl_5$ is applied to the counter 266 via the gate 265. This counter 266 delivers a pulse $t_4$ whose state is "1" for the period from $l$ to $l+1$, and returns to its initial state when its count reaches a specific number such as $l$. Similarly, the timing signal $cl_5$ is applied to the counter 264. This counter delivers a one bit output to reset the flip-flop 262 when its count reaches the number of pulses for the interrupt processing period, i.e., the number (for example $n$) of pulses $cl_{14}$ in FIG. 8. In other words, the flip-flop 262 is set only during the interrupt processing mode. The pulse $t_4$ is applied to the gate 244 and opens this gate. As a result, the address of the partner device 2(*i*), which address has been set in the register 211 by the computer 2(1) through the address line 41, is sent to the data line 33 via the gate 244 and buffer amplifier 242**. This operation is performed for the period the pulse $t_4$ is "1." Said specific value $l$ is significant of the computer 2(1). Similarly, other specific values $l$ are determined to be significant of the individual computers 2(2) through 2($n$). The value $l$ indicates the address of the initial requesting computer. Upon ending the transmission of the address, the flip-flop 261(1) is reset by the output of gate 244. Thus, the address signal of the partner computer 2($i$) is produced at the time when the pulse $t_1$ becomes a "1" and the counter counts number of $cl_5$. Then this address signal is supplied to the initial address discriminator 18 (FIG. 11) of central control device 1. Because the pulse $cl_{12}$ is "1" during the interrupt processing mode, the address signal from the data line 33 synchronizes with $cl_4$ and is applied to the register 182. The register 182 stores all the contents of the address signal at the time the count number of $cl_{14}$ reaches $l+1$. The contents of this register are delivered from the gates 188(1) through 188($m$), synchronizing with the signal $cl_5$ of the same timing as $cl_{14}$.

The signal $cl_{14}$ being delayed by one bit each by the delay circuit 187 is supplied to the counter 184. At the time when $l$ number of $cl_{14}$ is counted, i.e., at the timing of $(l+1)^{th}$ $cl_{14}$, the gate 186($l$) is opened by the output of decoder 185 whereby a signal $bl$ is generated. This output signal $a$ and the signal $b$ are supplied to the address memory device 15. In the address memory device 15, as shown in FIG. 12, the flip-flop 156($l$) is set by the signal $bl$. When the period of interrupt processing mode ($cl_{12}$="1") is over, a timing signal T is applied to the gate 155, and the contents of register 153($l$) are applied from the gate 157($l$), synchronizing with $cl_1$. This address pattern $dl$ goes to the address discriminator 23 of computer 2($l$) via the data line 33. In the address discriminator, as shown in FIG. 15, said address pattern enters the register 232. The half of the contents of this register indicates the address of the communication device on its own side, the remaining contents indicate the address of the communication device on the other side. Since the address of the device on its own side was stored previously in the memory 234′, the first half contents of the register 232 are fully coincident with the contents of the memory 234′, and thus a signal is delivered from the gate 237(2), to set the flip-flop 238. As a result, the signal $t_2$ becomes a "1" and is applied to the gate 267(1) of the transmission sequencer 26 in FIG. 16. At the time of transmitting data to the bus, i.e., at the time when $t_2$ is "1," the output $\overline{Q}$ of flip-flop 262 and the output Q of flip-flop 261(3) undergo AND logic at the gate 267(1). Thus, in the communication mode, the data is set in the register 210, the flip-flop 261(3) is set, and a "1" output is generated at the time when $t_2$ is "1." The output of gate 267(1) goes further to the gate 268(1) for AND logic against $\overline{cl_3} \cdot \overline{cl_3}$ provides a timing for data transmission. When the output of gate 268(1) becomes a "1," this output is applied to the gate 243 whereby the data in the register 210 enters the data line 33, synchronizing with $cl_2$.

While, in view of the partner computer 2($i$), the address pattern supplied from the bus control device 1 is applied to the register 232 of address discriminator as in FIG. 15. When the latter half address of register 232 is fully coincident with that of memory 234′, an output is provided from the gate 237(3), and the flip-flop 238′ is set. As a result, the signal $t_3$ becomes a "1" and is applied to the gate 267(2) of transmission sequencer 26 in FIG. 17. When $t_3$ is "1" and the outputs Q of flip-flops 261(2) and 261(3) are "0," i.e., $\overline{Q}$ is "1," the output of gate 260(2) becomes "1," and the flip-flop 261(2) is set. The output of gate 260(2) serves as an input to the gate 267(2). At the gate 267(2), the output of gate 260(2), the output $\overline{Q}$ of flip-flop 262 and the signal $t_3$ undergo AND logic, and at the gate 268(2), the output of gate 267(2) and $\overline{cl_3}$ undergo AND logic. As a result, an output "1" is provided from the gate 268(2) at the data receiving timing ($t_3$="1") and at the timing where data can be written into the register 210, i.e., the output of gate 260(2) is "1," and data is being supplied to the bus 33. By this operation, the data on the bus 33 is set in the register 210 by way of the buffer amplifier 251 and gate 252. In the state where the data on the bus is set in the register 210, the flip-flop 261(2) is "1," and the contents in the register 210 is read into the computer when a D read signal comes therein via the line 42. As a result, the flip-flop 261(2) is reset by the output of gate 213.

Upon receiving a D set signal, the communication device on the transmission side sets the data into the register 210. While, the communication device on the receiving side, when receiving a D read signal, transfers to the computer the data sent into the register 210. At the end of the communication, not data but a specific pattern indicating the end of the communication is set into the register 210. The specific pattern, like data, is applied to the data line 33 and supplied to the terminate signal detector 17 of central control device 1 in FIG. 13.

This pattern is set into the register 172 by way of the gate 171. The set content is compared with the end pattern stored in the memory 173. When the comparison reaches a coincidence, an output is delivered from the gate 175. The gates 176(1) through 176($n$) receive in sequence a timing pulse from the decoder 163 via the gate 164. Thus, the gates 176(1) through 176($n$) deliver an output in sequence. These output signals $c_1$ through $c_n$ are applied to the address memory device 15, as shown in FIG. 11, to reset the flip-flops 156(1) through 156($n$). By this means, the transmission of the address pattern is stopped. At the same time, a reset signal $e_1$ is applied to the counter 112 of pulse generator, thereby resetting this counter.

Thus, in the foregoing operation sequence, the computers connected to the bus can exchange data with each other. What has been described above is an example where one computer makes a request for data exchange with another. It is apparent that data exchange among large numbers of computers can be accomplished on a time division basis. For example, when a plurality of computers make communication requests concurrently, the flip-flops 156 (FIG. 11) disposed in correspondence to the communication requesting computers are set, and the addresses stored in the memory 152 and register 153 are supplied to the gates 165(1) of address control device 16 (FIG. 12) via the gate 157. The address signals after gates 165(1) are transmitted on a time division basis according to the output of decoder 163. Then the computers corresponding to these address patterns start exchanging data with each other.

In the foregoing data exchange system, the transmission of address and data is synchronized with the pulse provided from the pulse generator, regardless of the operation timings of the computers connected to the bus. Therefore, the data exchange system of this invention enables communication over such a long distance as more than 30 meters, without being limited by the operation timings of the computers. According to the invention, all the computers are connected to one bus, and data exchange among the computers is controlled by a common bus control device. This makes it possible to simplify the system organization and reduce the cost of the system as a whole. In the system of this invention, data transfer is carried out according to the bus-available signal supplied from the control device. More specifically, in the foregoing embodiment, data transfer is performed according to a pair of address signals of an interrupt requesting computer and its requested computer. This communication can be easily multiplexed, if necessary. Furthermore the system of this invention permits a communication device connected to an arbitrary point on the bus to exchange data with another communication device connected to the bus. Thus, by movably connecting a communication device to the bus, data exchange between this device and another can be realized while moving the communication device within the range of the bus. Besides, the system of this invention makes a great variety of useful applications available. For example, in the control system where the associated computers are used intermittently, several computers are disposed for use in common, and one of these computers which is not in use is selected from any one of many terminals whereby the computers can be utilized at a maximum efficiency. Furthermore, in the system of this invention, data can be exchanged among many computers and, hence, it is possible to realize a computer control system in which all the computers are backed up by the use of one backup computer.

While the principles of the invention have been described above in connection with specific embodiments, and particular modifications thereof, it is to be clearly understood that this description is made only by way of example and not as a limitation on the scope of the invention.

We claim:

1. A data exchange system comprising a plurality of devices providing data to be exchanged between devices, which devices have individual addresses, a common bus to which all of said devices are connected, and a central control unit connected to one end of said bus, said central control unit comprising the following means (b), (d) and (e), and each of said devices connected to the bus comprising the following means (a), (c), (f) and (g):

a. means for transmitting a one bit interrupt signal to said bus in response to a request from one of said devices for communication with another,
b. means for receiving an interrupt signal from the bus and for transmitting to the bus a specific address signal pattern $Ad_1$ indicating which one of the devices is making a communication request and which one of the devices is being requested,
c. means for receiving said specific address signal pattern $Ad_1$ and for transmitting the address $Ad_3$ of said requested device at a time assigned only to the requesting device when a communication request occurs,
d. means for receiving said address $Ad_3$ and for discriminating the address $Ad_2$ of the communication requesting device according to the time at which said address $Ad_3$ is transmitted,
e. means for repeatedly transmitting an address signal pattern $AD_4$ consisting of the address $Ad_2$ of the communication requesting device and the address $Ad_3$ of the requested device to the bus at intervals of predetermined definite timing for data exchange,
f. means for receiving said address signal pattern $Ad_4$ and for transmitting data to the bus at said timing intervals for data exchange only when said address $Ad_2$ and the address assigned to the communication requesting device are coincident with each other, and
g. means for receiving said address pattern $Ad_4$ and for receiving said data only when said address $Ad_3$ and the address assigned to the communication requested device are coincident with each other.

2. A data exchange system in accordance with claim 1, in which said means for transmitting said specific address signal pattern $Ad_1$ comprises means for transmitting a signal pattern made up of bits consisting of all "1"s.

3. A data exchange system in accordance with claim 2 in which said bus comprises an interrupt line for transmitting the interrupt pulse, a line for transmitting the data and the address signal patterns, and a clock line for transmitting a clock signal which determines the timing at which the data and the addresses are transmitted.

4. A data exchange system in accordance with claim 3 in which, in order to synchronize the data and addresses with a clock for their transmission, said central control unit further comprises a synchronous pulse generator, including an oscillator for generating clock pulses at predetermined definite intervals, first means for extracting one pulse every definite interval from said clock pulse train, second means for alternately generating discrimination pulses a and b having levels capable of being discriminated from the clock pulse at the same timing as that of the extracted pulse, and means for combining the outputs of said first and second means, thereby forming a synchronous pulse having said clock pulse train disposed between every pair of said discrimination pulses *a* and *b*.

5. A data exchange system in accordance with claim 4 in which the means (b) comprises clock regenerator means for extracting from the output of said synchronous pulse generator a clock pulse train $cl_1$ located between said discrimination pulses a and b and for providing a timing pulse $cl_5$ at the same time as said discrimination pulses a and b, flip-flop circuit means for providing a "1" output only for the period from the timing pulse $cl_5$ following immediately after the interrupt pulse to the subsequent timing pulse, an AND circuit having inputs connected to the output of said flip-flop and the output $cl_1$ of said clock regenerator, and transmitter means for transmitting the output of said AND circuit to the bus.

6. A data exchange system in accordance with claim 5 in which the means (c) comprises memory means for storing the same pattern as said specific address signal pattern $Ad_1$, first gate circuit means for comparing the address pattern supplied from the bus and the stored contents of said memory means and for providing an output $t_1$ only when all the bits are coincident between said address pattern and the contents of said memory means, second gate circuit means controlled to be opened at a time assigned to the communication requesting device when the output $t_1$ of said first gate circuit means is produced, and transmitter means for transmitting the address of the requested device to the bus by way of said second circuit means.

7. A data exchange system in accordance with claim 6 in which counter means is provided to control said second gate circuit, which counter means counts pulses supplied at certain definite intervals, returns to its initial state when the count reaches a certain definite number $n$, and delivers a "1" output at a time between a count value $l$ assigned to the communication requesting device and the value $l+1$, wherein the output of said counter means is applied to said second gate circuit means.

8. A data exchange system in accordance with claim 6 in which the means (d) comprises counter means for counting the pulses supplied at said predetermined definite intervals, decoder means for decoding the contents of said counter means, and a plurality of gates opened in sequence by the output of said decoder means, wherein an output is derived from the gate corresponding to the time at which the address of the requested device is transmitted.

9. A data exchange system in accordance with claim 8 in which the means (e) comprises memory means including a plurality of memories for storing the addresses of the devices connected to the bus, register means including a plurality of registers corresponding to said memories for storing the addresses of the requested devices, first gate circuit means for controlling the operation supplying the addresses of the requested devices to said registers, wherein the register to be supplied with the address is selected according to the time at which the address of the requested device is transmitted, and second gate circuit means controlled so that the contents of said memories and said registers are transmitted in sequence to the bus, the gate to be opened being selected according to the timing at which the address of the requested device is transmitted.

100 A data exchange system in accordance with claim 1 in which the means (f) comprises memory means for storing the address of the device in a storage location, register means for accepting and storing an address pattern $Ad_4$ consisting of the address $Ad_2$ of the communication requesting device and the address $Ad_3$ of the requested device; first gate circuit means for providing a "1" output when all the bits are coincident between the contents of said memory means and the address $Ad_2$ of said register means; and second gate circuit means controlled to be opened by the "1" output of said first gate circuit means so that the data is transmitted to the bus.

11. A data exchange system in accordance with claim 1 in which the means (g) comprises memory means storing the address of the device in a storage location, register means for accepting and storing an address pattern $Ad_4$ pairing the address $Ad_2$ of the communication requesting device and the address $Ad_3$ of the requested device, first gate circuit means for providing a "1" output when all the bits are coincident between the contents of said memory means and the address $Ad_3$ of said register means, and second gate circuit means controlled to be opened by the "1" output of said first gate circuit means so that the data from the bus is accepted by the requested device.

12. A data exchange system in accordance with claim 1 in which said bus comprises an interrupt line for transmitting the interrupt pulse, a line for transmitting the data and the address signal patterns, and a clock line for transmitting a clock signal which determines the timing at which the data and the addresses are transmitted.

13. A data exchange system in accordance with claim 1 in which, in order to synchronize the data and addresses with a clock for their transmission, said central control unit further comprises a synchronous pulse generator, including an oscillator for generating clock pulses at predetermined definite intervals, first means for extracting one pulse every definite interval from said clock pulse train, second means for alternately generating discrimination pulses a and b having levels capable of being discriminated from the clock pulse at the same timing as that of the extracted pulse, and means for combining the outputs of said first and second means, thereby forming a synchronous pulse having said clock pulse train disposed between every pair of said discrimination pulses $a$ and $b$.

14. A data exchange system in accordance with claim 13 in which the means (b) comprises clock regenerator means for extracting from the output of said synchronous pulse generator a clock pulse train $cl_1$ located between said discrimination pulses $a$ and $b$ and for providing a timing pulse $cl_5$ at the same time as said discrimination pulses a and b, flip-flop circuit means for providing a "1" output only for the period from the timing pulse $cl_5$ following immediately after the interrupt pulse to the subsequent timing pulse, an AND circuit having inputs connected to the output of said flip-flop and the output $cl_1$ of said clock regenerator, and transmitter means for transmitting the output of said AND circuit to the bus.

15. A data exchange system in accordance with claim 1 in which the means (c) comprises memory means for storing the same pattern as said specific address signal pattern $Ad_1$, first gate circuit means for comparing the address pattern supplied from the bus and the stored contents of said memory means and for providing an output $t_1$ only when all the bits are coincident between said address pattern and the contents of said memory means, second gate circuit means controlled to be opened at a time assigned to the communication requesting device when the output $t_1$ of said first gate circuit means is produced, and transmitter means for transmitting the address of the requested device to the bus by way of said second gate circuit means.

16. A data exchange system in accordance with claim 1 in which the means (d) comprises counter means for counting the pulses supplied at said predetermined definite intervals, decoder means for decoding the contents of said counter means, and a plurality of gates opened in sequence by the output of said decoder means, wherein an output is derived from the gate corresponding to the time at which the address of the requested device is transmitted.

* * * * *